(12) United States Patent
Balotta et al.

(10) Patent No.: US 12,004,556 B2
(45) Date of Patent: Jun. 11, 2024

(54) CONVEYOR AND METHOD OF ALIGNING ROD-SHAPED ARTICLES

(71) Applicant: G.D S.p.A., Bologna (IT)

(72) Inventors: Stefano Balotta, Bologna (IT); Moreno Arbizzani, Bologna (IT); Massimo Malavolta, Bologna (IT); Marco Bruschi, Bologna (IT); Giuliano Gamberini, Bologna (IT); Luca Federici, Bologna (IT)

(73) Assignee: G.D S.P.A., Bologna (IT)

( * ) Notice: Subject to any disclaimer, the term of this patent is extended or adjusted under 35 U.S.C. 154(b) by 174 days.

(21) Appl. No.: 17/632,691

(22) PCT Filed: Aug. 6, 2020

(86) PCT No.: PCT/IB2020/057445
§ 371 (c)(1),
(2) Date: Feb. 3, 2022

(87) PCT Pub. No.: WO2021/024222
PCT Pub. Date: Feb. 11, 2021

(65) Prior Publication Data
US 2022/0279837 A1    Sep. 8, 2022

(30) Foreign Application Priority Data
Aug. 8, 2019    (IT) .................. 102019000014352

(51) Int. Cl.
*A24C 5/35* (2006.01)
*A24C 5/32* (2006.01)
*B65B 19/04* (2006.01)

(52) U.S. Cl.
CPC ............... *A24C 5/35* (2013.01); *A24C 5/326* (2013.01); *A24C 5/327* (2013.01); *B65B 19/04* (2013.01); *B65G 2201/0226* (2013.01)

(58) Field of Classification Search
None
See application file for complete search history.

(56) References Cited

U.S. PATENT DOCUMENTS 4,287,981 A    9/1981    Allen et al.
5,566,812 A *  10/1996   Irikura .................. A24C 5/478
                                                 198/471.1
(Continued)

FOREIGN PATENT DOCUMENTS

EP    0679345 A1    11/1995
EP    2353408 A2    8/2011
(Continued)

OTHER PUBLICATIONS

International Search Report and Written Opinion dated Oct. 13, 2020 from International Patent Application No. PCT/IB2020/057445.

*Primary Examiner* — William R Harp
(74) *Attorney, Agent, or Firm* — SHUTTLEWORTH & INGERSOLL, PLC; Timothy J. Klíma

(57) ABSTRACT

A conveyor for aligning rod-shaped articles and including a succession of flutes which are movable along a feed path and which are configured to hold respective rod-shaped articles or groups of rod-shaped articles. For each flute, the conveyor has an abutment portion, disposed at least at one end of the flute to define an abutment surface for one end of the rod-shaped article or group of rod-shaped articles housed in the suction flute. The abutment portion is provided with at least one suction zone to hold the end of the rod-shaped article or group of rod-shaped articles by suction against the abutment portion. The suction zone is defined by a plurality of suction perforations, connected or connectable to a negative pressure source and whose transverse size is, for (Continued)

example, smaller than 1 mm, preferably smaller than 0.8 mm and, still more preferably, smaller than 0.6 mm.

19 Claims, 4 Drawing Sheets

(56) References Cited

U.S. PATENT DOCUMENTS

| | | | |
|---|---|---|---|
| 7,837,025 B2 * | 11/2010 | Draghetti | A24C 5/478 198/469.1 |
| 10,104,905 B2 * | 10/2018 | Bez | A24C 5/1857 |

FOREIGN PATENT DOCUMENTS

| | | |
|---|---|---|
| EP | 2570039 A2 | 3/2013 |
| WO | 2014155317 A1 | 10/2014 |

* cited by examiner

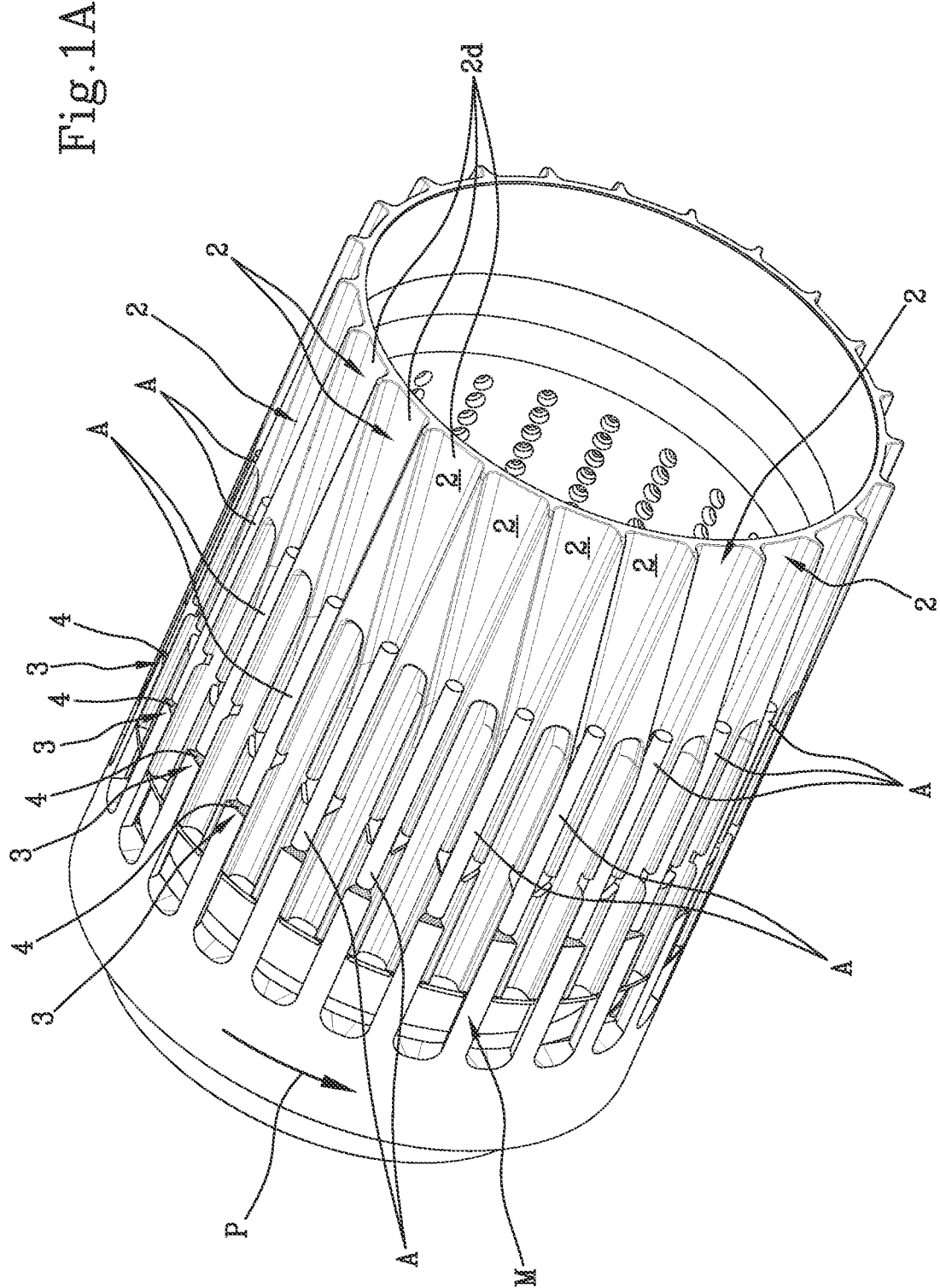

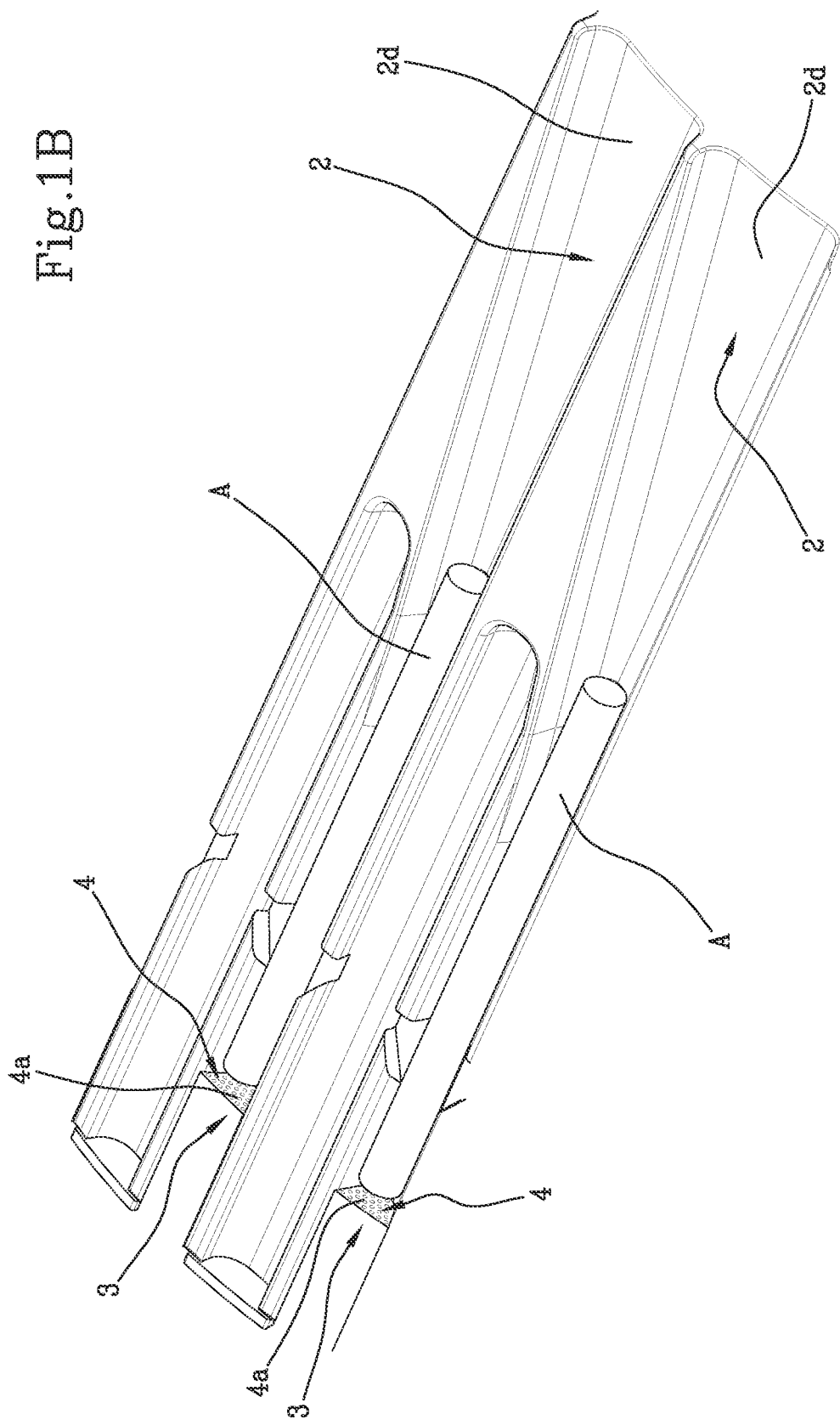

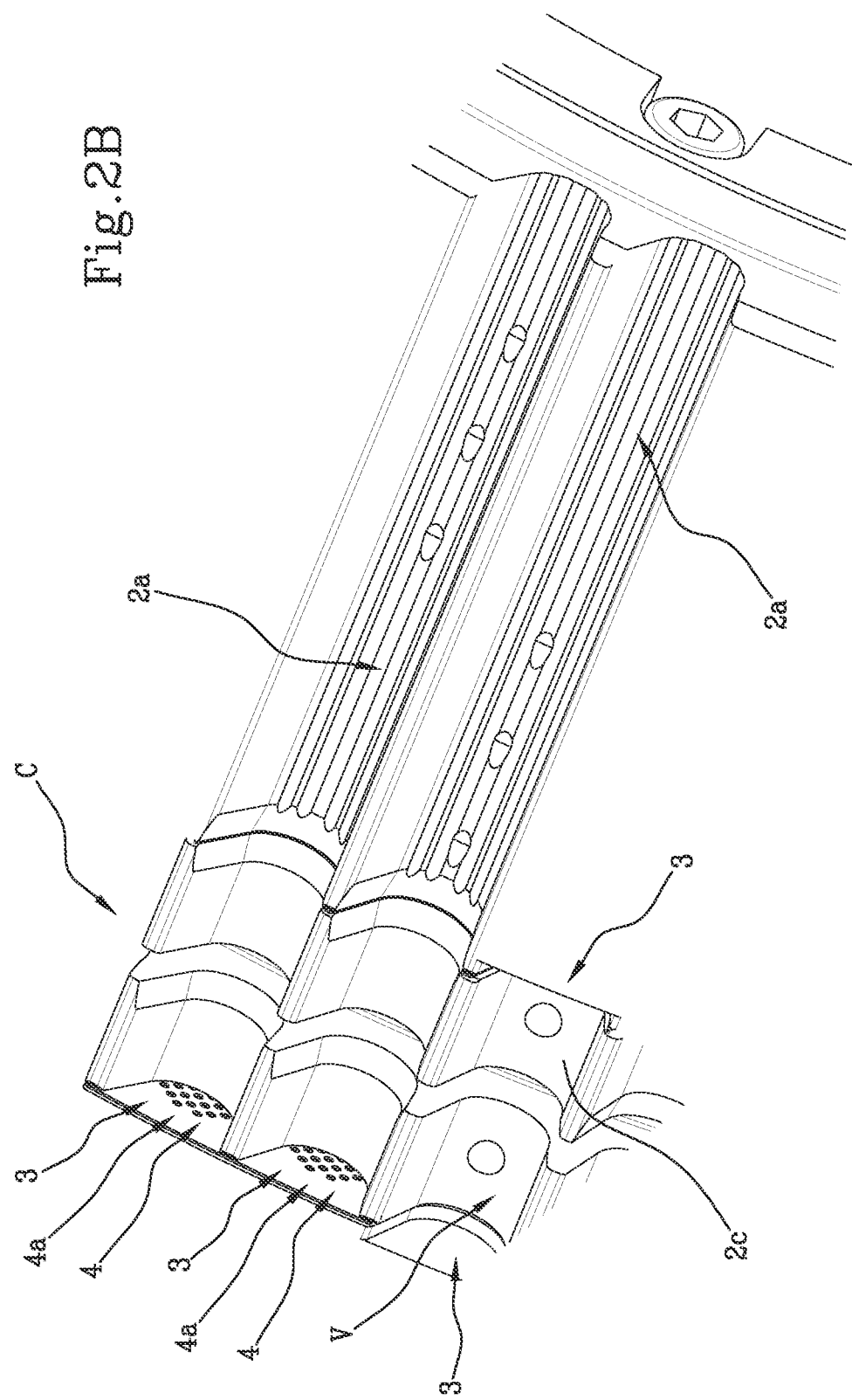

CONVEYOR AND METHOD OF ALIGNING ROD-SHAPED ARTICLES

This application is the National Phase of International Application PCT/IB2020/057445 filed Aug. 6, 2020 which designated the U.S.

This application claims priority to Italian Patent Application No. 102019000014352 filed Aug. 8, 2019, which application is incorporated by reference herein.

TECHNICAL FIELD

This invention relates to a conveyor and a method for aligning rod-shaped articles.

The term "rod-shaped articles" is used to denote finished products or semi-products having a longitudinal axis of extension and applicable in the technical field of smoking articles and related fields. By way of example, in the context of this invention (and according to a non-exhaustive list), cigarettes of various different kinds, cigars, cigarillos and the like may be considered as finished products and cigarette rod segments and/or filter segments (whether single or composite) may be considered as semi-products.

BACKGROUND ART

In the production of rod-shaped articles, conveyors are used which are configured to align the articles along a predetermined trajectory so they can be placed at a predetermined axial position, for example in a filter tip attachment machine, where a multiple length filter rod is subdivided into a succession of single length segments advancing transversely one after the other.

More in detail, once the rods have been cut into single length segments, the single length segments are placed in specific suction flutes of a drum, and by means of a train of drums disposed in succession, the single length segments which are tangentially offset from each other, are aligned axially with each other in such a way as to define a succession of single segments advancing one after the other, with their lateral ends aligned, in successive flutes of an aligning drum. Usually, alignment is accomplished by the mantle of the aligning drum which, in proximity to one or both ends of each suction flute, is provided with an abutment portion which is configured to receive the article in abutment against it. A solution of this kind is known, for example, from patent application EP679345.

Other customary drums use the same concept to hold the articles in proximity to the mantle once the articles have been transferred axially into the flute, specifically in a zone of the machine where the articles pass from moving axially to moving transversely.

Disadvantageously, in both cases, the impact between the abutment portion and the rod-shaped article may cause the article to bounce back, with the risk of damage to the article resulting, for example, in the filling material falling out of it. In effect, it should be borne in mind that the article being moved axially impacts the abutment portion with an open end of it, from where filling fibres or particles (which are held together by mutual cohesion) can easily fall apart as a result of shocks and vibrations.

For this reason, the abutment portion is provided with a suction opening whose function is to hold the article against the abutment portion so as to prevent the problems mentioned above. An alignment drum made in accordance with a configuration of this kind is described in patent application WO2014/155317 in the name of the present Applicant.

It has been noticed that the above mentioned suction configuration may itself lead to the loosening up, and hence unwanted sucking in, of particles, fibres or other filling components of the rod-shaped article (be it a filter, a tobacco rod or other similar component) precisely on account of the suction which, if set at excessively high values, can cause damage to the article. Conversely, insufficient suction may be too weak to oppose the risk of the article being damaged by rebounding.

As a result, the particles are sucked into the suction ducts, where they are trapped and, over time, can cause clogging which obstructs the suction ducts and makes it necessary to periodically clean the ducts.

U.S. Pat. No. 4,287,981 discloses a mantle made from a porous material, in particular at the base of the suction flutes, in the place of the customary suction flutes. This solution, however, is irrelevant to the problem set out above.

SUMMARY OF THE INVENTION

In this context, the technical purpose which forms the basis of this invention is to propose a conveyor and a method for aligning rod-shaped articles to overcome the above mentioned drawbacks of the prior art.

More specifically, this invention has for an aim to provide a conveyor and a method for aligning rod-shaped articles which can prevent damage to the rod-shaped articles and/or loss of the material which the rod-shaped article is made of.

A further aim of this invention is to provide a conveyor and a method for aligning rod-shaped articles which can reduce maintenance requirements.

The technical purpose indicated and the aims specified are substantially achieved by a conveyor and a method for aligning rod-shaped articles comprising the technical features described in one or more of the appended claims.

This invention discloses a conveyor for aligning rod-shaped articles, which comprises a succession of suction flutes movable along a feed path and which is configured to hold respective rod-shaped articles or groups of rod-shaped articles.

Each rod-shaped article comprises a plurality of particles or fibres having a given transverse size, or a filling material also made up of particles or fibres having a given transverse size. The given transverse size of the particles or fibres is preferably greater than 0.9 mm and, still more preferably, greater than 1 mm.

The suction flutes are oriented perpendicularly to the feed path. For each suction flute, the conveyor has an abutment portion, disposed at a respective end of the suction flute to define an abutment surface for one end of the rod-shaped article or group of rod-shaped articles housed in the suction flute. The abutment portion is provided with a suction zone to hold the end of the article or group of articles by suction against the abutment portion. The suction zone is defined by a plurality of suction perforations, connected or connectable to a negative pressure source and whose transverse size is smaller than 1 mm, preferably smaller than 0.8 mm and, still more preferably, smaller than 0.6 mm.

Advantageously, the transverse size smaller than 1 mm (or preferably smaller than 0.8 mm and, still more preferably, smaller than 0.6 mm) allows preventing the particles or fibres of the rod-shaped article from finding their way into a suction duct which is connected or connectable to the negative pressure source, thus preventing unwanted clogging.

In other words, the suction holes of the suction zone are smaller in transverse size than the particles or fibres of the rod-shaped article.

This invention also provides a method for holding rod-shaped articles on a conveyor as described above, comprising the steps of preparing a succession of rod-shaped articles, inserting the succession of rod-shaped articles into respective suction flutes of the conveyor and, simultaneously with or after the step of inserting, axially moving at least some of the articles along the respective suction flutes until the front ends of the articles come into abutment against an abutment portion of the respective suction flute.

The method also comprises holding the end of the respective rod-shaped article by suction provided through the abutment portion.

The step of holding by suction is accomplished by means of a plurality of suction holes whose transverse size is smaller than the transverse size of the fibres or particles of the rod-shaped article or of the filling material of the rod-shaped article, so that these fibres or particles are not sucked in through the suction holes.

The dependent claims, which are incorporated herein by reference, correspond to different embodiments of the invention.

BRIEF DESCRIPTION OF THE DRAWINGS

Further features and advantages of the invention are more apparent in the indicative, hence non-limiting, description of a preferred but non-exclusive embodiment of a conveyor and a method for aligning rod-shaped articles, as illustrated in the accompanying drawings, in which:

FIG. 1A is a schematic representation of an embodiment of the conveyor of this invention;

FIG. 1B is a schematic representation of a detail of the conveyor of FIG. 1A;

FIG. 2B is a schematic representation of a detail of the conveyor of FIG. 2A.

DETAILED DESCRIPTION OF PREFERRED EMBODIMENTS OF THE INVENTION

Figure 2A:
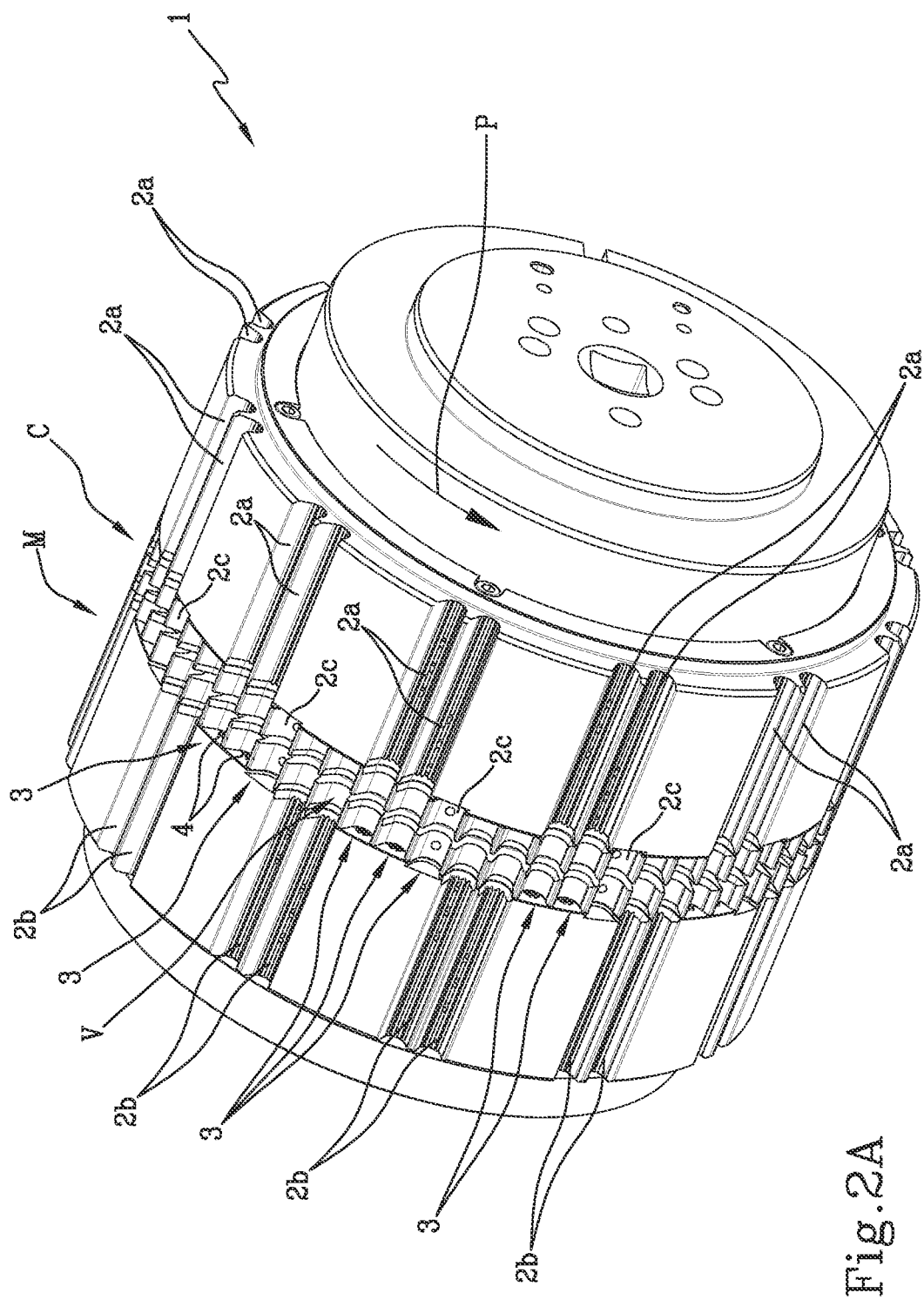
FIG. 2A is a schematic representation of a further embodiment of the conveyor of this invention.

With reference to the accompanying drawings, the numeral 1 denotes in its entirety a conveyor for aligning rod-shaped articles A and which, for simplicity of description, is hereinafter called "conveyor 1".

By "rod-shaped articles A" is meant any articles such as all kinds of cigarettes, cigars, cigarillos and the like. For example, the term "rod-shaped articles A" may be used to denote cigarette rods and/or filter rods (whether multi-segment or single-segment).

The conveyor 1 comprises a succession of flutes 2 which are moved along a feed path P. In the accompanying drawings, the conveyor 1 is represented in the form of a drum, hence the feed path P is defined by a rotation of the drum.

The flutes 2 are preferably suction flutes 2 and are configured to hold respective rod-shaped articles or groups of rod-shaped articles A. In other words, the suction flutes 2 are configured to cooperate in holding the rod-shaped articles A at least along a portion of the feed path P.

The suction flutes 2 are oriented perpendicularly to the feed path P. In other words, an axis of extension of the suction flutes 2 extends perpendicularly to the feed path P and in parallel with a positioning plane of the feed path.

Preferably, the suction flutes 2 have an arcuate shape and extend along the respective axes of extension which are perpendicular to the feed path P of the conveyor 1. Still more preferably, the suction flutes 2 have the shape of a U. In other words, the suction flutes 2 have a shape that is suitable for receiving and holding the rod-shaped articles A.

At least for each suction flute 2, the conveyor 1 has an abutment portion 3, disposed at least at one end of the suction flute 2 to define an abutment surface for one end of the rod-shaped article or group of rod-shaped articles A housed in the suction flute 2. Preferably, the abutment surface may be defined by a central portion of the conveyor 1. In an embodiment of the conveyor 1 of this invention, the abutment portion 3 may be disposed at both ends of the suction flute 2 to define a space for holding a rod-shaped article or group of rod-shaped articles A.

The abutment portion 3 is provided with at least one suction zone 4 to hold the end of the article or group of articles A by suction against the abutment portion 3. The suction zone 4 is connected or connectable to a source of negative pressure (not illustrated in the accompanying drawings) so as to hold the rod-shaped article A (or the group of rod-shaped articles A) by suction. Preferably, the suction zone 4 is in fluid communication with a suction duct (not illustrated) which is directly connected or connectable to the aforementioned negative pressure source.

It should be noted that the suction zone 4 is also connected or connectable to a compressed air source (not illustrated in the accompanying drawings and, at any particular instant during machine operation, a jet of compressed air may be injected through the suction zone 4. In other words, a flow of compressed air may be discharged to generate a flow of air in the opposite direction from that of the negative pressure source so as to clear the suction zone 4 of any dust that may cause obstructions.

In use, a rod-shaped article A may be accelerated into one end of the suction flute 2 so as to be axially received by the abutment portion 3. That way, the suction zone 4 is able to hold the rod-shaped article A by suction against the abutment portion 3, preventing shocks or jolts which may lead to loss of material or damage to the rod-shaped article A.

Alternatively, a rod-shaped article A may be inserted into the suction flute 2, for example through an upper portion of the suction flute 2 itself, and aligned against the abutment surface through the suction from the suction zone 4.

The suction zone 4 of each abutment portion 3 may be defined in a lower portion of the abutment portion 3 disposed in proximity to the bottom surface of the respective suction flute 2. In other words, the suction zone 4 may be a portion of the abutment surface, as shown in FIG. 2B for example.

Alternatively, the suction zone 4 may cover the entire abutment surface, as shown in FIG. 1B.

The suction zone 4 is defined by a plurality of suction perforations, denoted in their entirety by the reference label 4a. The suction perforations 4a are connected or connectable to the aforementioned negative pressure source. In other words, the suction perforations 4a are connected or connectable to the suction duct, which is directly connected or connectable to the aforementioned negative pressure source.

Each suction perforation 4a of the suction zone 4 is preferably a suction hole 4a and has a transverse size of less than 1 mm.

Preferably, each suction hole 4a of the suction zone 4 has a transverse size of less than 0.8 mm.

Still more preferably, each suction hole 4a of the suction zone 4 has a transverse size of less than 0.6 mm.

In other words, each suction hole 4a has a transverse size that is smaller than (that is, less than) the transverse size of the particles or fibres of the rod-shaped article A processed on the conveyor 1.

Advantageously, the transverse size of each suction hole 4a allows preventing the particles or fibres forming part of the rod-shaped article A from finding their way into the suction duct which is connected or connectable to the negative pressure source, thus preventing unwanted clogging of the duct and/or of the negative pressure source.

The suction holes 4a of the suction zone 4 are arranged in two or more rows in such a way as to cover at least one cross-sectional dimension of the respective suction flute 2.

The suction holes 4a of the suction zone 4 may be arranged according to a distributed pattern in two directions on the abutment surface.

Alternatively, the suction holes 4a of the suction zone 4 may be arranged in two or more rows and according to a distributed pattern in two directions on the abutment surface.

The suction holes 4a of the suction zone 4 are arranged according to a distributed pattern in such a way as to cover at least one cross-sectional dimension of the respective suction flute 2.

The suction holes 4a of the suction zone 4 are arranged in two or more rows and according to a distributed pattern in such a way as to cover at least one cross-sectional dimension of the respective suction flute 2.

In other words, the suction holes 4a are arranged on the suction zone 4 (that is, on the abutment surface) in such a way as to allow the rod-shaped article A, specifically the end of the rod-shaped article A, to be held effectively.

In an embodiment of the conveyor 1, the suction zone 4 is made as one piece with the abutment portion 3. More specifically, the suction holes 4a are made directly in a monobloc wall defining the abutment portion 3 itself (that is, the abutment surface). The holes may be made directly in a monobloc element defining the abutment portion 3 and at least the related suction flute 2.

In a further embodiment of the conveyor 1, the suction zone 4 is made in the form of a perforated insert that can be removably inserted into the abutment portion 3 (that is, the abutment surface). Alternatively, the perforated insert is removably applicable on the abutment portion 3 (that is, the abutment surface).

In a further embodiment, the suction zone 4 is made in the form of a porous element that can be removably inserted into the abutment portion 3 (that is, the abutment surface). Alternatively, the porous element is removably applicable on the abutment portion 3 (that is, the abutment surface).

In a further embodiment, not illustrated, the suction zone 4 is made in the form of a mesh—for example, a metallic or plastic mesh—which allows the suction to pass through it.

Whatever the case, the removability is particularly advantageous in the case of format changeover, where the rod shaped article may be formed from particles or fibres of a different size and the size of the suction holes can be adapted to the different size by substituting the insert or porous element.

Described below with reference to FIGS. 1A and 1B is a first embodiment of the conveyor 1 of the invention.

FIG. 1A shows a conveyor 1 made in the form of a drum. The drum comprises a mantle M provided with the suction flutes 2 and the abutment portions 3. The abutment portions 3 may be made as one with the mantle M.

The drum is a braking drum, where each suction flute 2 has a first end that is provided with the abutment portion 3 and a second end, opposite to the first end, that is open to receive a respective rod-shaped article A fed in axially. Preferably, the second end of the suction flute 2 has a configuration that converges towards the first end.

In other words, each suction flute 2 may comprise a receiving portion 2d configured to receive the rod-shaped articles A fed to it. The receiving portion 2d is also configured to accompany the rod-shaped article A to a longitudinal portion of the suction flute 2 (defining the main portion of the suction flute 2 itself).

The receiving portion 2d is shaped to converge from a perimeter edge of the mantle M (that is, of the conveyor 1) to the longitudinal portion of the suction flute 2. In use, a rod-shaped article A is accelerated axially towards the suction flute 2 and, as the drum (that is, the conveyor 1) moves, the receiving portion 2d accompanies the rod-shaped article A into the main portion of the suction flute 2, ensuring that it is correctly inserted in the axial direction.

The abutment portion 3 provided with the suction zone 4 is located at the end of the suction flute 2 opposite the end with the receiving portion 2d. In the accompanying drawings, the suction zone 4 covers the entire abutment section. Other embodiments, where the suction zone 4 covers, for example, only a bottom portion of the abutment section, are also imaginable.

Furthermore, the suction zone 4 represented in the accompanying drawings is made as one piece with the abutment section but other embodiments, such as the perforated insert or the porous element, are also imaginable.

Advantageously, in this embodiment, when the rod-shaped article A is accelerated towards the suction flute 2, the suction zone prevents its impact against the abutment portion 3 from resulting in a jolt that would cause it to fall out of the suction flute 2 or that would damage it. Furthermore, following impact, the suction holes 4a advantageously prevent the particles, fibres or other components making up the rod-shaped article A from being sucked into the suction zone 4 and from causing unwanted clogging.

Described below with reference to FIGS. 2A and 2B is another embodiment of the conveyor 1 of the invention.

FIG. 2A shows a conveyor 1 made in the form of a drum. The drum comprises a mantle M provided with the suction flutes 2 and the abutment portions 3. The abutment portions 3 may be made as one with the mantle M.

The drum is a centring drum provided at least with first suction flutes 2a and second suction flutes 2b, each provided with a respective abutment portion 3 and alternated with each other along the feed path P. The abutment surfaces of the first suction flutes 2a and the abutment surfaces of the second suction flutes 2b face axially opposite directions. The abutment portion 3 of each first suction flute 2a is axially offset relative to the abutment portion 3 of each second suction flute 2a so that the first suction flutes 2a perform longitudinal alignment of corresponding front ends of rod-shaped articles A in a first direction and in a first abutment plane, whilst the second suction flutes 2b perform longitudinal alignment of corresponding front ends of rod-shaped articles A in a second direction, opposite to the first direction, and in a second abutment plane parallel to and spaced from the first abutment plane. The abutment surfaces of the first and second suction flutes 2a, 2b are provided with the suction holes 4a.

For example, in this conveyor 1, the suction flutes 2 comprise a first set of suction flutes 2 and a second set of suction flutes 2, alternated with each other in such a way that the free end of each first suction flute 2a is disposed along a first perimeter edge of the conveyor 1 (that is, of the mantle M) and a free end of each second suction flute 2b is disposed along a second perimeter edge of the conveyor 1 opposite to the first perimeter edge of the conveyor 1 (that is, of the mantle M).

The mantle M is provided with abutment portions 3, each provided with the suction zone 4, disposed in a central portion C of the mantle M itself, defining the aforementioned first and second abutment plane.

The centring drum also has third suction flutes 2c, alternated with respective first and second suction flutes 2a and 2b and each extending between a respective pair of abutment portions 3 axially aligned with the abutment surfaces of the first and second suction flutes 2a and 2b.

In other words, the suction flutes 2 can be provided with the abutment portion 3 at both ends of them, thus defining, in a central portion C of the mantle M, a containing space V (open at the top) for containing the rod-shaped article A.

That way, the third suction flutes 2c can receive respective rod-shaped articles A which are already axially aligned at a position between the first and the second abutment plane.

Preferably, the abutment surfaces of the third suction flutes 2c are not provided with the suction holes 4a. In other words, the abutment portions 3 may not be provided with the suction zone 4.

Where the suction zone 4 is provided, on the other hand, it is represented as covering only a portion of the abutment section. Alternatively, the suction zone 4 may cover the entire abutment section.

Furthermore, the suction zone 4 represented in the accompanying drawings is made as one piece with the abutment section but other embodiments, such as the perforated insert or the porous element, are also imaginable.

In use, the rod-shaped articles are placed in the suction flutes 2 through an opening at the top and are misaligned with each other in the different suction flutes 2. The suction zone 4 is therefore configured to move the rod-shaped articles A within the suction flutes 2 so as to align them all in the central portion C of the drum (that is, of the conveyor 1).

The third suction flutes 2c, in which the rod-shaped articles A are not made to slide, are alternated between two first and two second suction flutes 2a and 2b but not between the two second suction flutes 2b and the following two first suction flutes 2a, because the drum is configured to receive at least five segments (four lateral and one central) obtained by cutting a single rod along four perpendicular cutting planes. Varying the number of segments into which the initial rod is cut changes the distribution of the first and second suction flutes 2a and 2b (and determines whether or not the third suction flutes 2c are necessary).

Advantageously, following impact of the rod-shaped article A against the abutment portion 3, the suction holes 4a prevent the particles, fibres or other components making up the rod-shaped article A from being sucked into the suction zone 4 and from causing unwanted clogging.

It is stressed that the two embodiments described above are only some of the possible embodiments of the conveyor 1 of this invention.

For example, even a conveyor 1 like the one shown in FIGS. 2A and 2B may be provided with the receiving portions 2d.

Alternatively, the conveyor 1 might be made in the form of a conveyor belt.

This invention also has for an object a method for holding rod-shaped articles. The method is performed on a conveyor 1 as described in the foregoing.

The method comprises the steps of preparing a succession of rod-shaped articles A and inserting the succession of rod-shaped articles A into respective suction flutes 2 of the conveyor 1. The step of inserting may be performed by accelerating the rod-shaped articles A into the respective suction flutes 2 or by inserting them through an open upper portion of the suction flutes 2.

Simultaneously with or after the step of inserting, the method comprises axially moving at least some of the articles along the respective suction flutes 2 until the front ends of the articles come into abutment against an abutment portion 3 of the respective suction flute 2.

At this point, the method comprises holding one end of a respective rod-shaped article or group of rod-shaped articles A by suction applied through an abutment portion 3 of the conveyor 1 provided with a suction zone 4. The step of holding by suction is accomplished by means of a plurality of suction holes 4a which are made in the abutment portion 3 and whose transverse size is smaller than the maximum transverse size of the fibres or particles of the rod-shaped article A or of the filling material of the rod-shaped article A.

Each suction hole 4a of the suction zone 4 has a transverse size of less than 1 mm.

Preferably, each suction hole 4a of the suction zone 4 has a transverse size of less than 0.8 mm.

Still more preferably, each suction hole 4a of the suction zone 4 has a transverse size of less than 0.6 mm.

More specifically, the step of holding by suction is carried out in such a way that the fibres or particles are not sucked in through the suction holes 4a.

In other words, stating that the step of holding by suction is carried out in such a way that the fibres or particles are not sucked in through the suction holes 4a must also be construed as meaning that the suction holes 4a do not move individual or groups of fibres or particles axially from their position inside the rod-shaped article A.

Advantageously, the method allows holding the rod-shaped articles A while preventing the abutment portion 3 from causing unwanted jolts or shocks.

This invention is capable of overcoming the disadvantages of the prior art.

Advantageously, the suction holes 4a, or suction perforations 4a, which are smaller in transverse size than a particle or fibre defining the rod-shaped article A make it possible to prevent clogging the suction zone 4. The smaller size of the suction holes 4a also prevents the suction from causing unwanted loss of material from the rod-shaped articles A.

It should be noted that the suction zones 4 of the conveyor 1 may be at different positions on the conveyor 1 so that alignment is carried out in different ways from one flute 2 to another.

The invention claimed is:

1. A conveyor for aligning rod-shaped articles, each rod-shaped article comprising a plurality of particles or fibers having a given transverse size or a filling material, wherein the conveyor comprises:
   a succession of flutes moved along a feed path and configured to hold respective rod-shaped articles or groups of rod-shaped articles, wherein the flutes are oriented perpendicularly to the feed path, and wherein the conveyor further has,
   at least for each flute, an abutment portion, disposed at a respective end of the flute to define an abutment surface for one end of the rod-shaped article or group of rod-shaped articles housed in the flute, the abutment portion being provided with a suction zone to hold the end of the rod-shaped article or group of rod-shaped articles by suction against the abutment portion;

wherein the suction zone is defined by a plurality of suction perforations, connected or connectable to a negative pressure source and whose transverse size is smaller than the transverse size of the particles or fibers of the rod-shaped article or of the filling material of the rod-shaped article.

2. The conveyor according to claim 1, wherein the suction zone of each abutment portion is defined in a lower portion of the abutment portion disposed in proximity to a bottom surface of the respective flute.

3. The conveyor according to claim 2, wherein the respective flute is a respective suction flute.

4. The conveyor according to claim 1, wherein the suction perforations of the suction zone are disposed in at least one chosen from two or more rows and according to a pattern distributed in two directions on the abutment surface.

5. The conveyor according to claim 1, wherein the suction zone is made monolithically as one piece with the abutment portion.

6. The conveyor according to claim 5, wherein the suction perforations are made directly in a monobloc part defining the abutment portion and at least the related suction flute.

7. The conveyor according to claim 1, wherein the suction zone is made in the form of a perforated insert removably insertable in, or applicable to, the abutment portion.

8. The conveyor according to claim 1, wherein the suction zone is made in the form of a porous element removably insertable in, or applicable to, the abutment portion.

9. The conveyor according to claim 1, wherein the suction perforations are connected or connectable to a negative pressure source and whose transverse size is smaller than 1 mm.

10. The conveyor according to claim 9, wherein the transverse size is smaller than 0.8 mm.

11. The conveyor according to claim 10, wherein the transverse size is smaller than 0.6 mm.

12. The conveyor according to claim 1, wherein the conveyor is made in the form of a drum comprising a peripheral mantle including the suction flutes and the abutment portions.

13. The conveyor according to claim 12, wherein the drum is a braking drum wherein each suction flute has a first end that includes the abutment portion and a second end, opposite to the first end, that is open to receive a respective rod-shaped article fed in axially.

14. The conveyor according to claim 13, wherein the second end of the suction flute has a configuration that converges towards the first end.

15. The conveyor according to claim 12, wherein the drum is a centering drum including first suction flutes and second suction flutes, each including a respective abutment portion and alternated with each other along the feed path, wherein the abutment surfaces of the first suction flutes and the abutment surfaces of the second suction flutes face axially opposite directions, and wherein the abutment portion of each first suction flute is axially offset relative to the abutment portion of each second suction flute so that the first suction flutes perform longitudinal alignment of corresponding front ends of rod-shaped articles in a first direction and in a first abutment plane, whilst the second suction flutes perform longitudinal alignment of corresponding front ends of rod-shaped articles in a second direction, opposite to the first direction, and in a second abutment plane parallel to and spaced from the first abutment plane; the abutment surfaces of the first and second suction flutes including the suction perforations.

16. The conveyor according to claim 15, wherein the centering drum also has third suction flutes, alternated with respective ones of the first and second suction flutes and each extending between a respective pair of abutment portions axially aligned with the abutment surfaces of the first and second suction flutes in such a way that the third suction flutes are configured to receive respective rod-shaped articles which are already axially aligned at a position between the first and the second abutment plane.

17. The conveyor according to claim 16, wherein the abutment surfaces of the third suction flutes are without the suction perforations.

18. The conveyor according to claim 12, wherein the abutment portions are made as one with the mantle.

19. A method for holding rod-shaped articles in a conveyor, comprising the following steps:
providing a conveyor for aligning rod-shaped articles, each rod-shaped article comprising a plurality of particles or fibers having a given transverse size or a filling material, wherein the conveyor comprises:
a succession of flutes moved along a feed path and configured to hold respective rod-shaped articles or groups of rod-shaped articles, wherein the flutes are oriented perpendicularly to the feed path, and wherein the conveyor further has,
at least for each flute, an abutment portion, disposed at a respective end of the flute to define an abutment surface for one end of the rod-shaped article or group of rod-shaped articles housed in the flute, the abutment portion being provided with a suction zone to hold the end of the rod-shaped article or group of rod-shaped articles by suction against the abutment portion;
wherein the suction zone is defined by a plurality of suction perforations, connected or connectable to a negative pressure source and whose transverse size is smaller than the transverse size of the particles or fibers of the rod-shaped article or of the filling material of the rod-shaped article;
preparing a succession of the rod-shaped articles, each article comprising a plurality of the particles or fibers having the given transverse size, or the filling material;
inserting the succession of rod-shaped articles into respective flutes of the conveyor;
simultaneously with or after the step of inserting, axially moving at least some of the articles along the respective flutes until the front ends of the articles come into abutment against the abutment portion of the respective flute;
holding the end of the respective rod-shaped article by suction provided through the abutment portion,
wherein the step of holding by suction is accomplished by a plurality of the suction perforations whose transverse size is smaller than the transverse size of the fibers or particles of the rod-shaped article or of the filling material of the rod-shaped article, so that these fibers or particles are not sucked in through the suction perforations.

* * * * *